United States Patent [19]

Maness

[11] Patent Number: 4,746,162
[45] Date of Patent: May 24, 1988

[54] PORTABLE GLARE SHIELD FOR SIDE WINDOW OF AUTOMOBILE

[76] Inventor: Raymond L. Maness, P.O. Box 176, Atlantic Beach, Fla. 32233

[21] Appl. No.: 929,432

[22] Filed: Nov. 12, 1986

[51] Int. Cl.$^4$ ............................................. B60J 3/00
[52] U.S. Cl. ........................... 296/97 R; 160/DIG. 3; 428/124; 428/192
[58] Field of Search ................ 428/31, 124, 195, 192; 296/97 K, 97 R

[56] References Cited

U.S. PATENT DOCUMENTS

| | | | |
|---|---|---|---|
| 1,388,446 | 8/1921 | Woodmansee | 296/97 K |
| 1,493,767 | 5/1924 | Reimer | 296/97 K |
| 2,991,119 | 7/1961 | Young | 296/97 E |
| 3,043,709 | 7/1962 | Ambroski | 428/216 |
| 3,085,827 | 4/1963 | Cederberg et al. | 296/97 K |
| 3,304,118 | 2/1967 | Jonas | 296/97 R |
| 3,511,365 | 5/1970 | Dow | 428/31 X |
| 3,522,968 | 8/1970 | Honor, Sr. | 296/97 R |
| 3,679,255 | 7/1972 | Nacarato | 296/97 K |
| 3,868,293 | 2/1975 | Selph | 296/97 R |
| 3,977,112 | 8/1976 | Breer, II | 428/121 X |
| 4,263,355 | 4/1981 | Sarkisian | 428/124 |
| 4,320,174 | 3/1982 | Rabinovitch et al. | 428/403 X |
| 4,357,898 | 11/1982 | Fehrenbacher | 428/121 X |
| 4,358,488 | 11/1982 | Dunklin et al. | 428/31 |
| 4,391,053 | 7/1983 | Anthony | 428/31 X |
| 4,410,594 | 10/1983 | Olson | 428/331 X |
| 4,528,232 | 7/1985 | Cliffe | 428/31 X |

Primary Examiner—Henry F. Epstein
Attorney, Agent, or Firm—Arthur G. Yeager

[57] ABSTRACT

Tinted sheet of semiflexible plastic with a reverse bend at the top edge to clip over the upper edge of and on the inside of a raiseable and lowerable side window of an automobile; preferably the sheet has a lateral fold to form the sheet into two planes intersecting at an angle of less than 180° to provide a pressure to hold the sheet against the window.

16 Claims, 1 Drawing Sheet

U.S. Patent    May 24, 1988    4,746,162
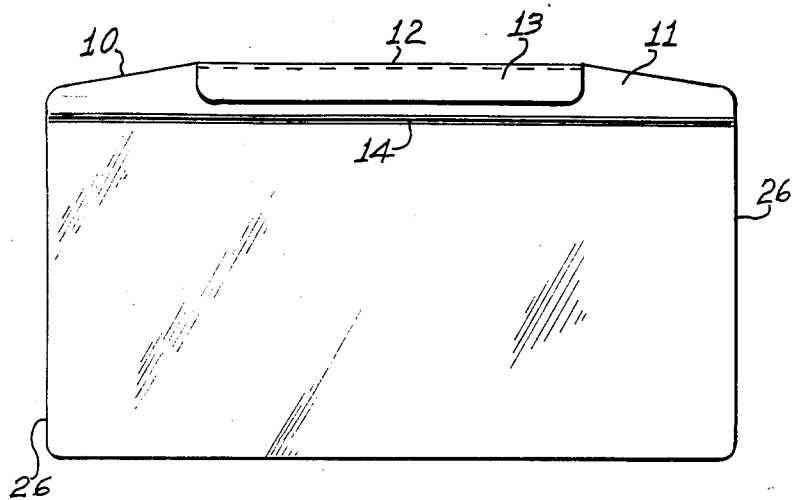
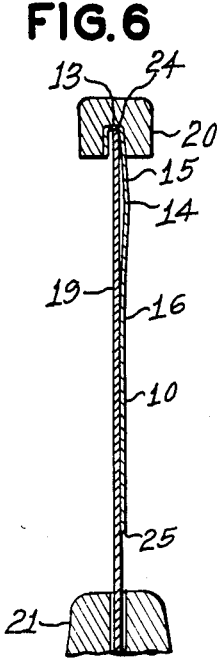
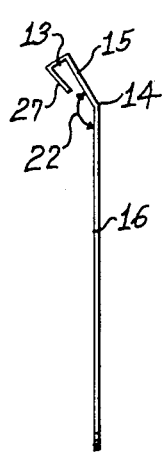
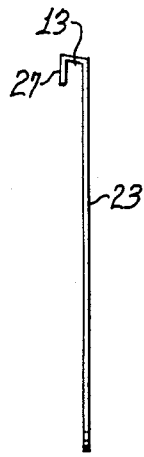
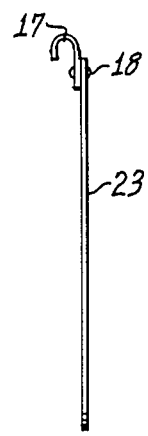
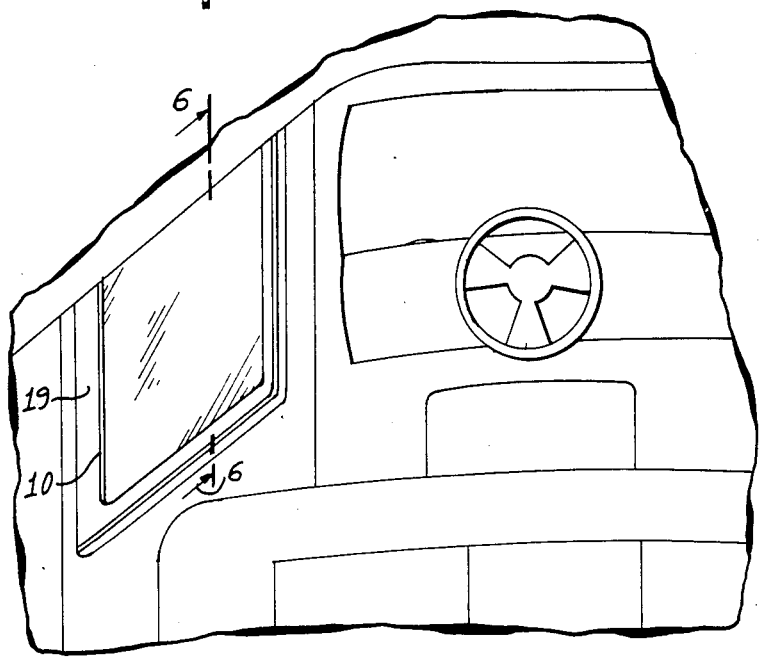
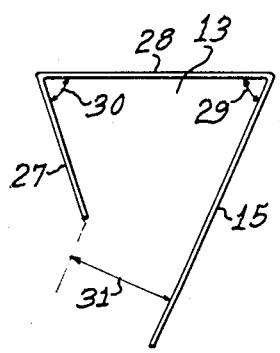

PORTABLE GLARE SHIELD FOR SIDE WINDOW OF AUTOMOBILE

BACKGROUND OF THE INVENTION

Vehicle operators and passengers are frequently subjected to high intensity light from the sun, bright sky, lights of passing vehicles, etc., which is bothersome, fatiguing and even dangerous if the glare is sufficient to cause blindness, momentary or long lasting. Automobile manufacturers and others skilled in the art have attempted to cope with these problems by providing windshields with tinted strips across the upper edge portion thereof, sun visors over windshields and permanent window tinting, and sun glasses. These latter products are highly restricted to particular small areas, or heavily tinted and permanent so that they are dangerous to operate the vehicle after dark because the reduction in light transmission is too great to permit good vision at night out the side window, for example. Some attempts have been made to provide the driver with movable tinted shields attachable to visors that can be pivoted into place in front of the drivers face when desired. Drivers and occupants have used towels, newspapers, maps, etc., to cover the side windows of vehicles to prevent glare and these dangerously obstruct drivers by creating blind spots.

It is an object of this invention to provide a transparent and portable glare shield for side windows of vehicles. It is another object to provide an integral tinted plastic sheet as a side window glare shield. Other objects include the provision of an improved side window glare shield which is economical in construction, transferable from vehicle to vehicle, and substantially covers the window. Still other objects will become apparent from the more detailed description which follows.

BRIEF SUMMARY OF THE INVENTION

This invention relates to a portable glare shield for removable attachment to the inside of a raiseable and lowerable side window of a vehicle, said glare shield being a sheet of semiflexible transparent material which transmits 20% to 40% of incident light, said sheet having an upper edge which includes a reverse bend member adapted clip over the upper edge of said window.

In a preferred embodiment the glare shield is a single, integral sheet of tinted plastic formed with a lateral fold line adjacent the top edge dividing the sheet into two planar sections joined at the fold line at an angle of less than 180° adapted to cause flexure of the sheet and press it against the inside of the window to which it is attached.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front elevational view of the glare shield of this invention;

FIG. 2 is an end elevational view of one embodiment of this invention;

FIG. 3 is an end elevational view of a second embodiment of this invention;

FIG. 4 is an end elevational view of a third embodiment of this invention;

FIG. 5 is a perspective view of the inside of an automobile showing how the glare shield of this invention is attached to the inside of a side window; and FIG. 6 is a cross sectional view taken at 6—6 of FIG. 5.

FIG. 7 is an enlarged end elevational view of the portion of the glare shield which clips over the top of the window.

DETAILED DESCRIPTION OF THE INVENTION

The features of this invention are best understood by reference to the attached drawings.

The glare shield 10 is a generally flat sheet of transparent material of a size to cover most of the inside surface of the side window to which it is attached. Generally, this is a rectangular shape. The glare shield 10 is designed to clip over the top edge of the vehicle window which is lowered to permit attachment of glare shield 10 thereto and then raised to close the window and, at the same time, to clamp glare shield 10 in place against the inside surface of the window.

Along top edge 12 of the top portion 11 of glare shield 10 there is a reverse bend section or member 13 which has an inside dimension about the same as the thickness of the window to which glare shield 10 is attached. Preferably, reverse bend section 13 is a length of top edge 12 which is molded or formed as an integral part of glare shield 10. An alternative, however, as shown in FIG. 4, is to employ a separate hook member 17 which is attached by one or more fasteners 18 to a flat sheet 23. Fasteners 18 may be rivets, adhesive clips, etc.

A preferred embodiment is shown in FIG. 2 wherein the main portion of glare shield 10 is formed into two intersecting planes by fold line 14 extending laterally across the sheet. The lower portion 16 of glare shield 10 is a large planar section, and the upper portion 15 is a much smaller planar section. Portions 15 and 16 intersect at fold line 14 at an included angle 22 of slightly less than 180°, preferably 150°-175°. When this glare shield is attached to the inside of a flat planar window the inherent semiflexibility of glare shield 10 will cause angle 22 to increase approaching 180°. This will cause lower portion 16 to flex and press itself against the window to prevent noisy flapping against the window.

The embodiment in FIG. 3 is the same as that of FIG. 2 except that there is no fold line 14. The entire portion of the glare shield, other than reverse bend section 13 is a flat planar sheet. This embodiment is entirely suitable in many instances. It may, however, tend to flap against the window due to vibrations of the vehicle or air currents inside the vehicle.

In FIGS. 5 and 6 there is illustrated the manner in which the glare shield 10 is used on the inside of side window 19. In FIG. 6 window 19 is rolled up into the upper window frame 20 with reverse bend section 13 hooked over the top edge 24 of window 19. Window 19 is also seated in lower window frame 21. The embodiment shown in FIG. 2 is illustrated in FIG. 6 with fold line 14 spaced a short distance below upper frame 20. It may be seen that when this type of glare shield is clamped into upper frame 20 it causes upper section 15 and lower section 16 to flex against window 19. Lower edge 25 of glare shield 10 will thereby be pressed against window 19 preventing any annoying flapping or other noises developed by vibrations of glare shield 10.

Glare shield 10 is preferably made of a transparent plastic sheet about 0.020 to 0.060 inch in thickness so as to provide the desired semiflexibility; i.e., self-supporting as a flat sheet with strength to maintain its flat structure and yet flexible enough to be bent as described above with respect to FIGS. 2 and 6. Suitable plastic materials include polycarbonates, acrylics, polyesters, polyvinyls, cellulose acetate, polyolefins, and the like. The most desirable is polycarbonate because of its combination of clarity, strength and durability.

The most desirable formulation for this invention is to employ a plastic material with the tinting material inherently a part of the sheet, i.e., incorporated into the sheet when it is manufactured. Other desirable additives may be included, e.g., materials to cause polarization, ultraviolet light absorbers, stabilizers, etc.

An alternative method of preparing the glare shield is to employ a sheet of untinted plastic and laminate to at least one side thereof a thin film of tinted plastic such as that sold to change clear windows to tinted windows. Such laminations are not preferred because they may exhibit imperfections such as bubbles, and they tend to delaminate after a period of use.

The tinting color is entirely a matter of choice, although, most experts appear to agree that a gray color is preferred. Other shades as are found on sunglasses are operable and intended to be included within the scope of this invention, e.g., green, blue, bronze, purple, yellow, etc. The concentration of the tinting should be sufficient to permit only 20% to 40% of the incident light to be transmitted therethrough.

The reverse bend 13 need only be a channel to fit over the upper edge of the window to which the glare shield 10 is attached. The length of bend section 13 may vary with different designs. In FIG. 1 the length from end to end is about one half the lateral length of the glare shield between side edges 26. It may be advantageous in certain designs for reverse bend 13 to be a plurality of spaced sections instead of a one-piece channel. It may also be advantageous for reverse bend section 13 as viewed in FIGS. 2–4 to be formed to clamp over the top edge of the window or merely hang over the top edge with no clamping action. In FIG. 2 the short leg 27 of reverse bend section 13 angles toward upper portion 15 so that leg 13 would have to be sprung outward to insert window 19 therein. In FIG. 3, however, short leg 27 is parallel to the main flat sheet 23 and thus no clamping action is provided. A preferred design for reverse bend 13 is shown in FIG. 7 wherein top leg 28 is at an acute angle with short leg 27 and with upper portion 15 of glare shield 10. Angles 29 and 30 should be from about 60°–80°. The length of leg 28 should be slightly greater than the thickness of the window and the distance 31 should be less than the thickness of the window. This design provides a clamping action which tends to press portion 15 against the window. This type of reverse bend 13 may be used with either type of glare shield shown in FIGS. 2 and 3.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to be secured by Letters Patent of the United States is:

1. A portable glare shield for removable attachment to the inside of a raiseable and lowerable side window of a vehicle, said glare shield being a sheet of semiflexible transparent material which transmits 20% to 40% of incident light, said sheet having an upper edge which includes a reverse bend adapted to clip over the upper edge of said window, said reverse bend including a top leg slightly longer than the thickness of said side window, a short leg bent at an angle of 60°–80° to one end of said top leg, said top leg being bent at an angle of 60°–80° with said sheet.

2. The glare shield of claim 1 wherein said sheet is a plastic sheet about 0.020 to 0.060 inch thick.

3. The glare shield of claim 1 wherein said sheet material is selected from the group consisting of polycarbonate, acrylic, polyester, polyvinyl, cellulose acetate, and polyolefin.

4. The glare shield of claim 3 the material is polycarbonate.

5. The glare shield of claim 1 wherein said sheet comprises a layer of untinted transparent flexible plastic material covered on at least one side thereof with a film of tinted material.

6. The glare shield of claim 1 wherein said sheet is a homogenous plastic material with a tinting substance intimately and uniformly dispersed therein.

7. The glare shield of claim 1 wherein said sheet is polarized to reduce glare.

8. The glare shield of claim 1 wherein said sheet has dispersed therein an ultraviolet light absorbent material.

9. A glare shield for an automobile side window comprising an integral sheet of semiflexible transparent material tinted to reduce light transmission therethrough, said sheet being generally rectangular in shape with a top portion adapted to be attached to the top edge of and on the inside surface of an automobile side window that is raiseable and lowerable, said top portion including a reverse bend section at the edge of the sheet to clip over the top of the window and spaced downwardly from said reverse bend section and parallel thereto a fold line extending laterally across the entire sheet to form an upper planar section above the fold line and a lower planar section below the fold line with the angle between said planar sections being about 150°–175° on the side of said sheet facing said window; said reverse bend section including a top leg section positioned at an angle of 60°–80° with said upper planar section and a short leg section positioned at the end of said top leg section opposite to said upper planar section and at an angle of 60°–80° between said short leg section and said top leg section.

10. The glare shield of claim 9 wherein said sheet is a plastic sheet about 0.020 to 0.060 inch thick.

11. The glare shield of claim 9 wherein said sheet material is selected from the group consisting of polycarbonate, acrylic, polyester, polyvinyl, cellulose acetate, and polyolefin.

12. The glare shield of claim 11 the material is polycarbonate.

13. The glare shield of claim 9 wherein the reduction in light transmission due to the tinting is 60% to 80%.

14. The glare shield of claim 9 wherein said sheet is a homogeneous plastic material with a tinting substance intimately and uniformly dispersed therein.

15. The glare shield of claim 9 wherein said sheet is polarized to reduce glare.

16. The glare shield of claim 9 wherein said sheet has dispersed therein an ultraviolet light absorbent material.

* * * * *